US012448829B2

(12) United States Patent
Nuss et al.

(10) Patent No.: US 12,448,829 B2
(45) Date of Patent: Oct. 21, 2025

(54) DOMESTIC APPLIANCE AND ELECTRIC CONNECTOR ASSEMBLY

(71) Applicant: Haier US Appliance Solutions, Inc., Wilmington, DE (US)

(72) Inventors: Bart Andrew Nuss, Fisherville, KY (US); Michael Goodman Schroeder, Crestwood, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 339 days.

(21) Appl. No.: 18/158,853

(22) Filed: Jan. 24, 2023

(65) Prior Publication Data

US 2024/0247525 A1 Jul. 25, 2024

(51) Int. Cl.
*E05D 11/00* (2006.01)
*F25D 23/02* (2006.01)
*E05D 3/06* (2006.01)

(52) U.S. Cl.
CPC ........ *E05D 11/0081* (2013.01); *F25D 23/028* (2013.01); *E05D 3/06* (2013.01)

(58) Field of Classification Search
CPC ...... E05D 11/0081; E05D 3/06; F25D 23/028
See application file for complete search history.

(56) References Cited

U.S. PATENT DOCUMENTS

| | | | | |
|---|---|---|---|---|
| 3,355,695 A * | 11/1967 | Overesch | E05D 11/0081 439/31 |
| 3,601,598 A * | 8/1971 | Horn | F21V 21/26 362/418 |
| 5,249,970 A * | 10/1993 | Jennings | H01R 13/567 439/31 |
| 8,366,220 B2 | 2/2013 | Oberhauser et al. | |
| 9,823,011 B2 | 11/2017 | Kempte | |
| 2022/0057133 A1* | 2/2022 | Oh | F25D 23/02 |

FOREIGN PATENT DOCUMENTS

| | | |
|---|---|---|
| KR | 20040049683 A | 6/2004 |
| KR | 20200067415 A | 6/2020 |

* cited by examiner

*Primary Examiner* — Matthew W Ing
(74) *Attorney, Agent, or Firm* — Dority & Manning, P.A.

(57) ABSTRACT

A domestic appliance may include a cabinet, a door, a hinge assembly, and a conductor assembly. The cabinet may define an internal chamber. The door may be movable relative to the cabinet between an open position and a closed position. The hinge assembly may rotatably secure the door to the cabinet. The conductor assembly may electrically connect the door to the cabinet. The conductor assembly may include a cabinet-side (CS) contact joined to the cabinet, a door-side (DS) contact joined to the door, and a first plate arm extending between the CS contact and the DS contact in electrical communication therewith. The first plate arm may be pivotable about a first conductor axis relative to the CS contact and a second conductor axis relative to the DS contact.

19 Claims, 7 Drawing Sheets

DOMESTIC APPLIANCE AND ELECTRIC CONNECTOR ASSEMBLY

FIELD OF THE INVENTION

The present disclosure relates generally to domestic appliances, such as refrigerator appliances, and more particularly to electric hinge connections on a domestic appliance.

BACKGROUND OF THE INVENTION

Domestic appliances, such as refrigerator appliances often include two or more movably connected members, such as a separate cabinet and door. For instance, refrigerator appliances generally include a cabinet that defines a chilled chamber for receipt of food articles for storage. In addition, refrigerator appliances include one or more doors rotatably hinged to the cabinet to permit selective access to items stored in chilled chamber(s). The refrigerator appliances can also include various storage components mounted within the chilled chamber and designed to facilitate storage of food items therein. Such storage components can include racks, bins, shelves, or drawers that receive items and assist with organizing and arranging of such items within the chilled chamber. As an example, some refrigerator appliances are often referred to as “wine chillers” due, in part, to their use of multiple shelves having brackets specifically shaped to receive a common 750 milliliter bottle of wine.

Refrigerator appliances are commonly positioned within a recess in a row of cabinets mounted to a wall in a kitchen. In some cases, it may be useful to have a multi-point hinge assembly capable of pivoting portions of the door or assembly about multiple different axes. For instance, in order to improve the appearance of the refrigerator appliance and minimize protrusion into kitchen walkways, certain refrigerator appliances are designed to be flush mount, where the front of the appliance door sits substantially flush with a front of the cabinets when the doors are closed.

Separate from or in addition to a multi-point hinge assembly, it is common for refrigerator appliances to include one or more electric components (e.g., electric light sources, electronic display(s), input buttons, etc.) on a door of the appliance. In order to draw power for such components or otherwise relay signals between different portions of the appliance, it may be necessary to run an electric wire from the door to the cabinet. However, typical wired connections may be fragile, unattractive, or risk interfering with the mechanical hinge assembly.

As a result, it would be useful to provide a domestic appliance or connector assembly addressing one or more of the above issues. In particular, it may be advantageous to provide a domestic appliance or connector assembly for electrically connecting two movably connected members that is robust, attractive, unobtrusive, or unlikely to interfere with movement between the two members.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a door, a hinge assembly, and a conductor assembly. The cabinet may define an internal chamber. The door may be movable relative to the cabinet between an open position and a closed position. The hinge assembly may rotatably secure the door to the cabinet. The conductor assembly may electrically connect the door to the cabinet. The conductor assembly may include a cabinet-side (CS) contact joined to the cabinet, a door-side (DS) contact joined to the door, and a first plate arm extending between the CS contact and the DS contact in electrical communication therewith. The first plate arm may be pivotable about a first conductor axis relative to the CS contact and a second conductor axis relative to the DS contact.

In another exemplary aspect of the present disclosure, a domestic appliance is provided. The domestic appliance may include a cabinet, a door, a hinge assembly, and a conductor assembly. The cabinet may define an internal chamber. The door may be movable relative to the cabinet between an open position and a closed position. The hinge assembly may rotatably secure the door to the cabinet to define movement of the door between the open position and the closed position. The conductor assembly may electrically connect the door to the cabinet indeterminate of the movement of the door between the open position and the closed position. The conductor assembly may include a cabinet-side (CS) contact joined to the cabinet, a door-side (DS) contact joined to the door, and a first plate arm extending between the CS contact and the DS contact in electrical communication therewith. The first plate arm may be pivotable about a first conductor axis relative to the CS contact and a second conductor axis relative to the DS contact.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
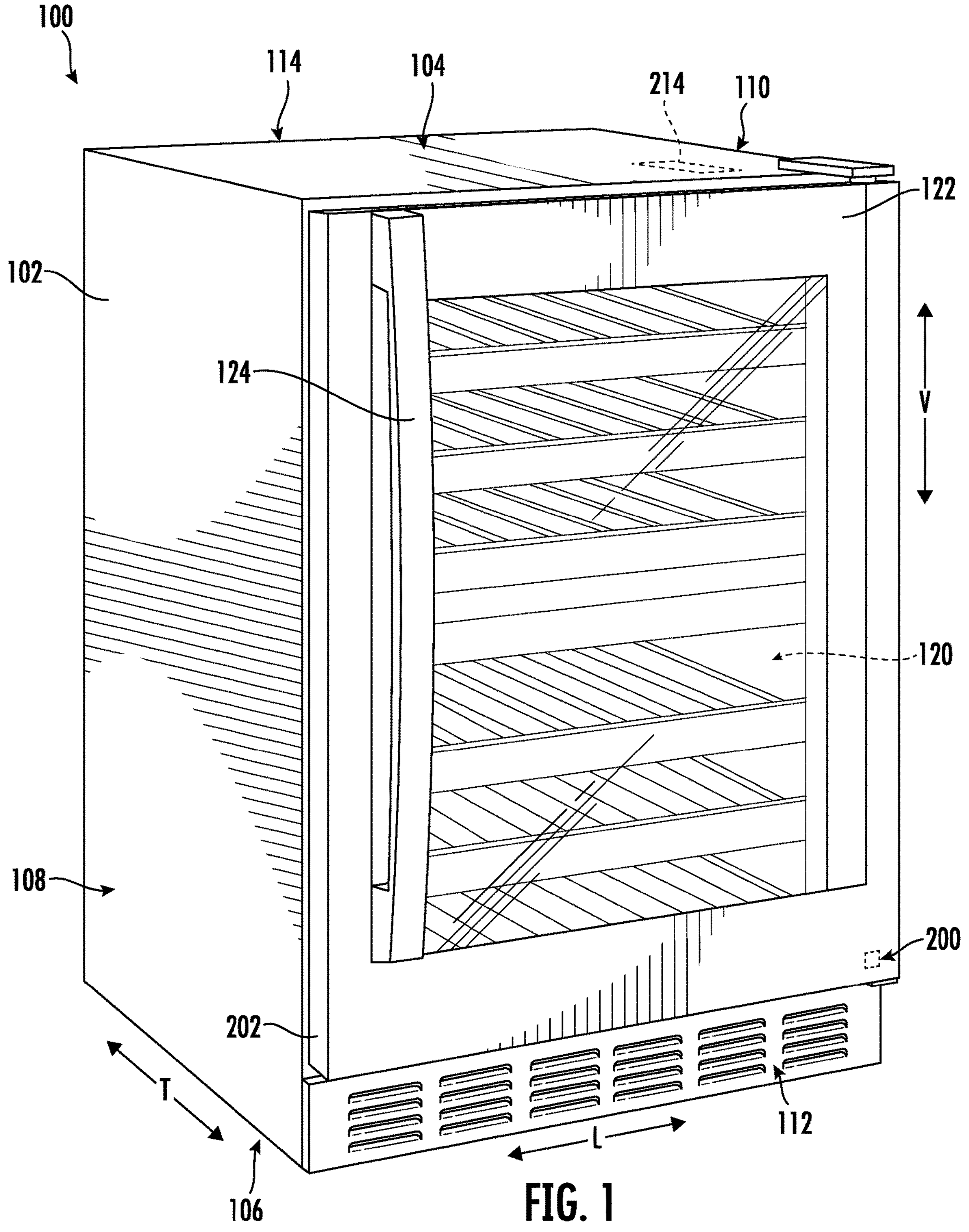
FIG. 1 provides a top perspective view of a refrigerator appliance according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
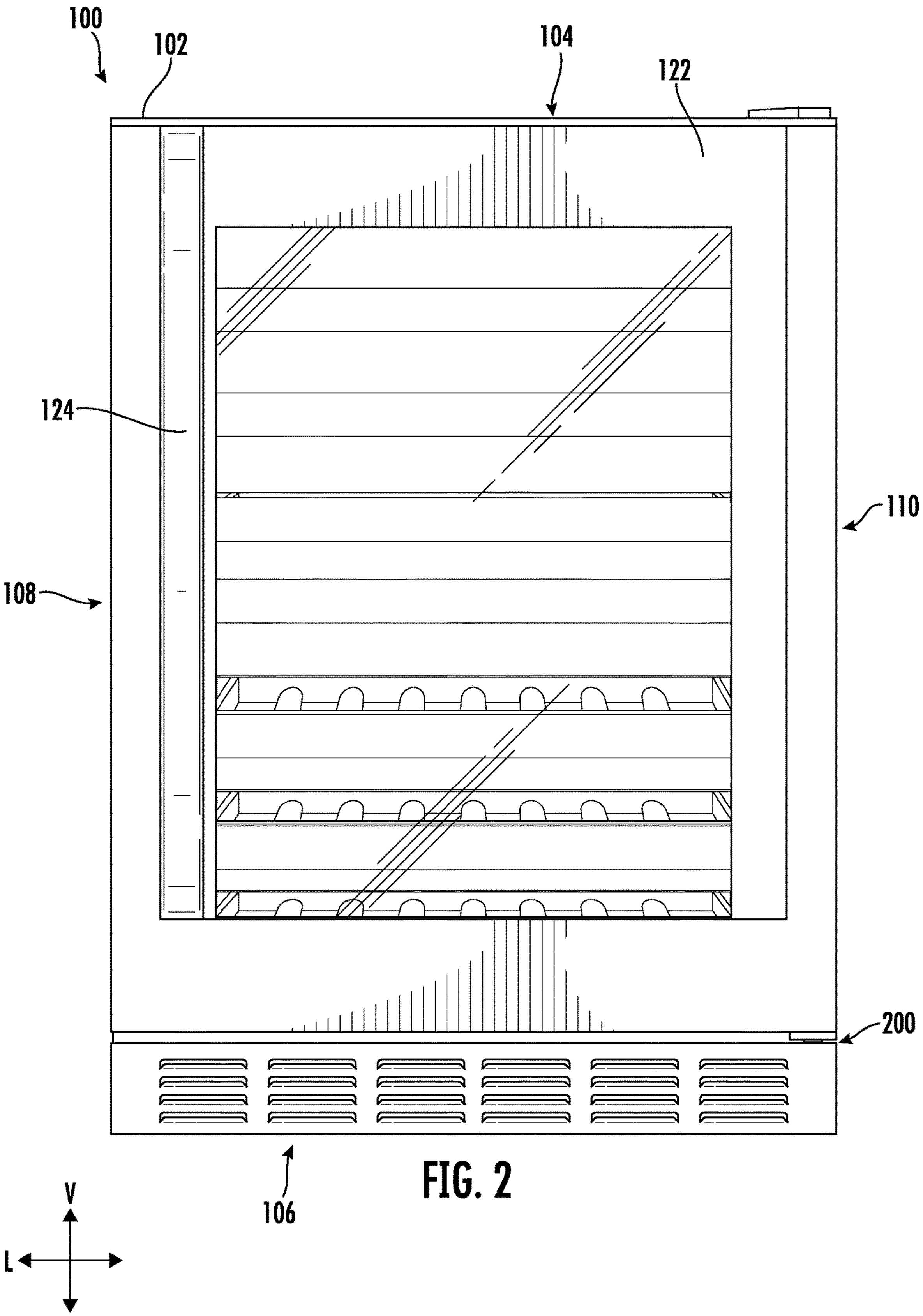
FIG. 2 provides an elevation view of the exemplary refrigerator appliance of FIG. 1, wherein the door is in a closed position.
Figure 3:
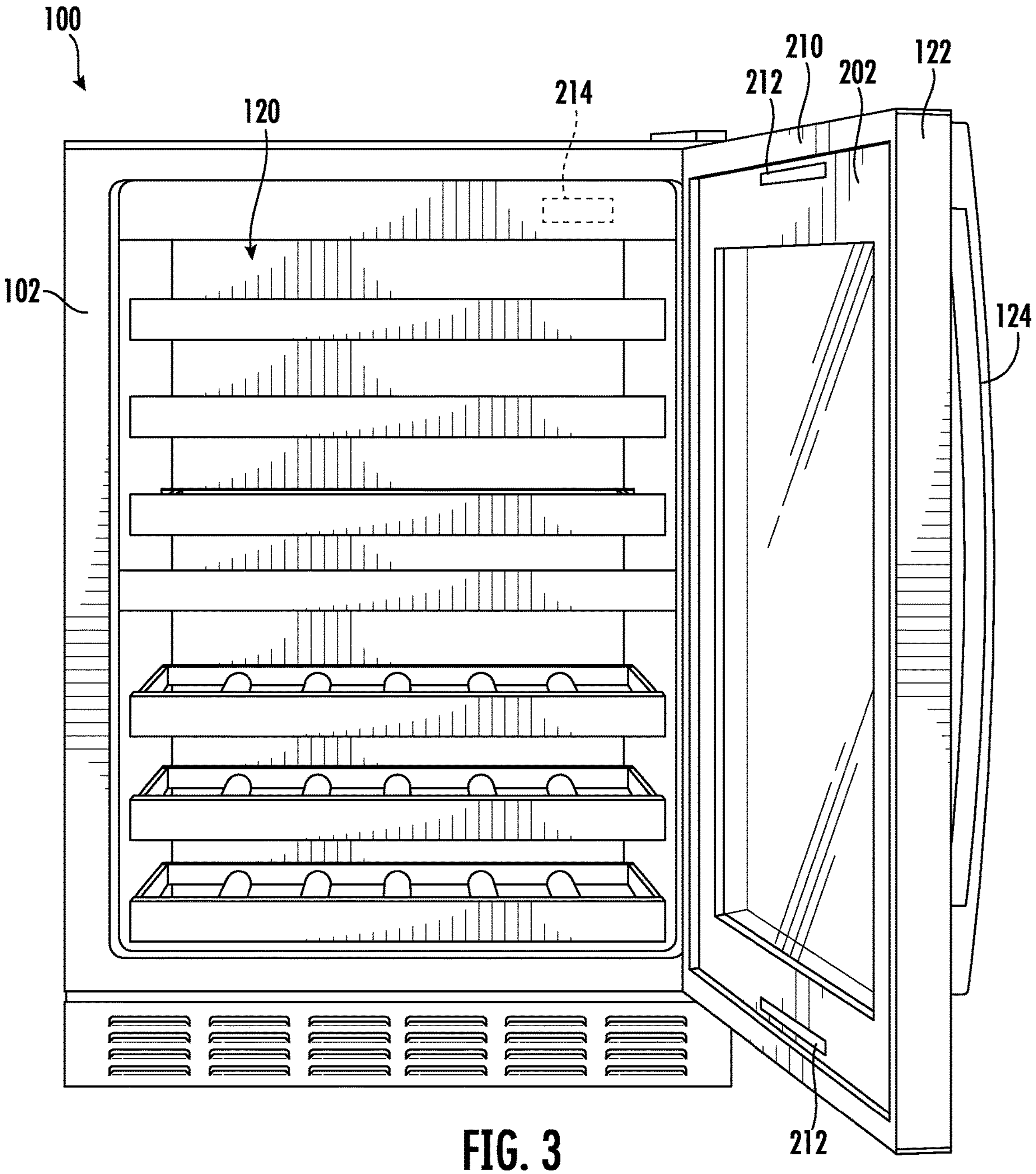
FIG. 3 provides an elevation view of the exemplary refrigerator appliance of FIG. 1, wherein the door is in an open position.
Figure 4:
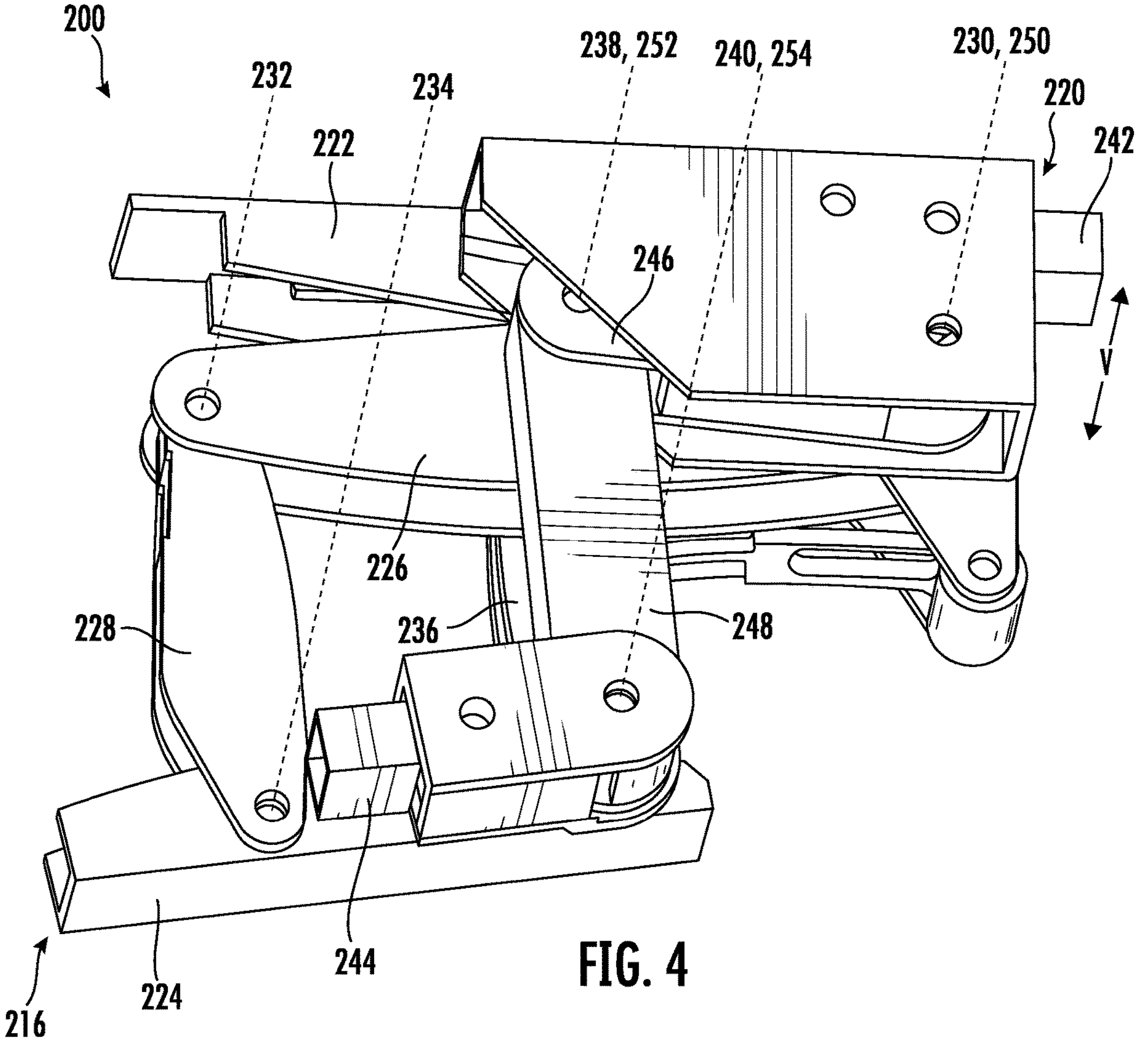
FIG. 4 provides a perspective view of a connector assembly of an appliance, according to exemplary embodiments of the present disclosure.
Figure 5:
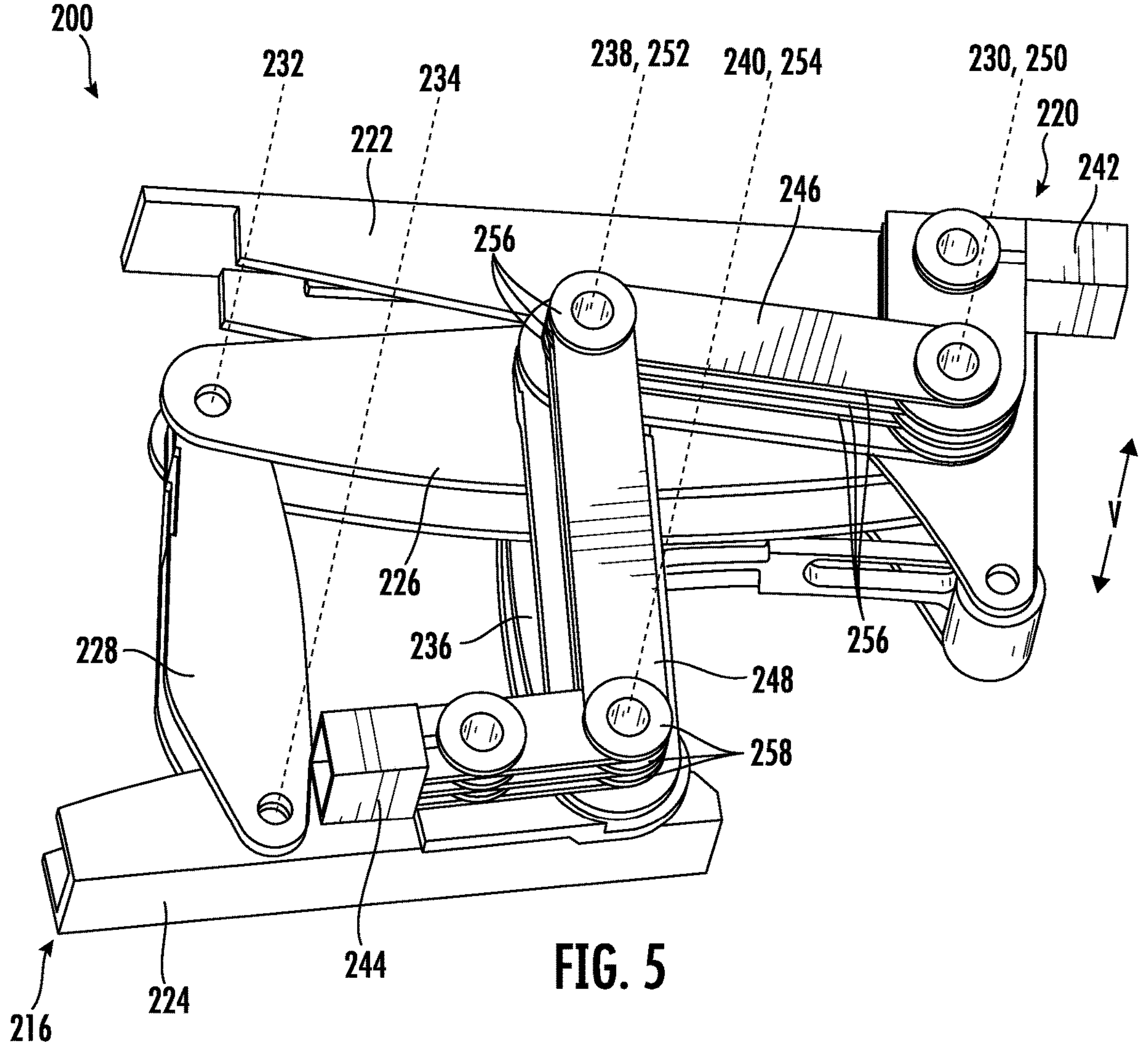
FIG. 5 provides a perspective view of the exemplary connector assembly of FIG. 4, wherein a portion has been removed for clarity.
Figure 6:
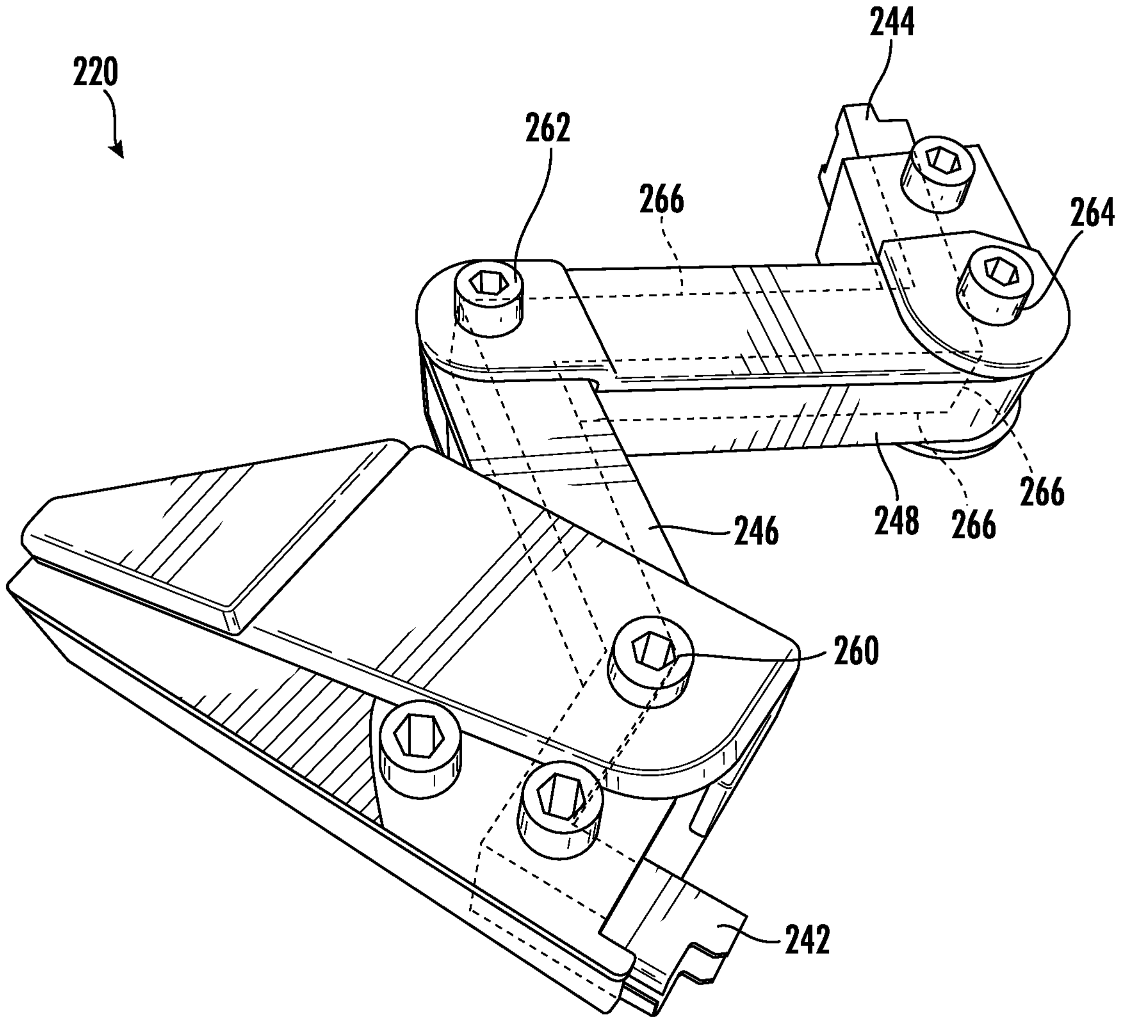
FIG. 6 provides a perspective view of a portion of the exemplary connector assembly of FIG. 4.
Figure 7:
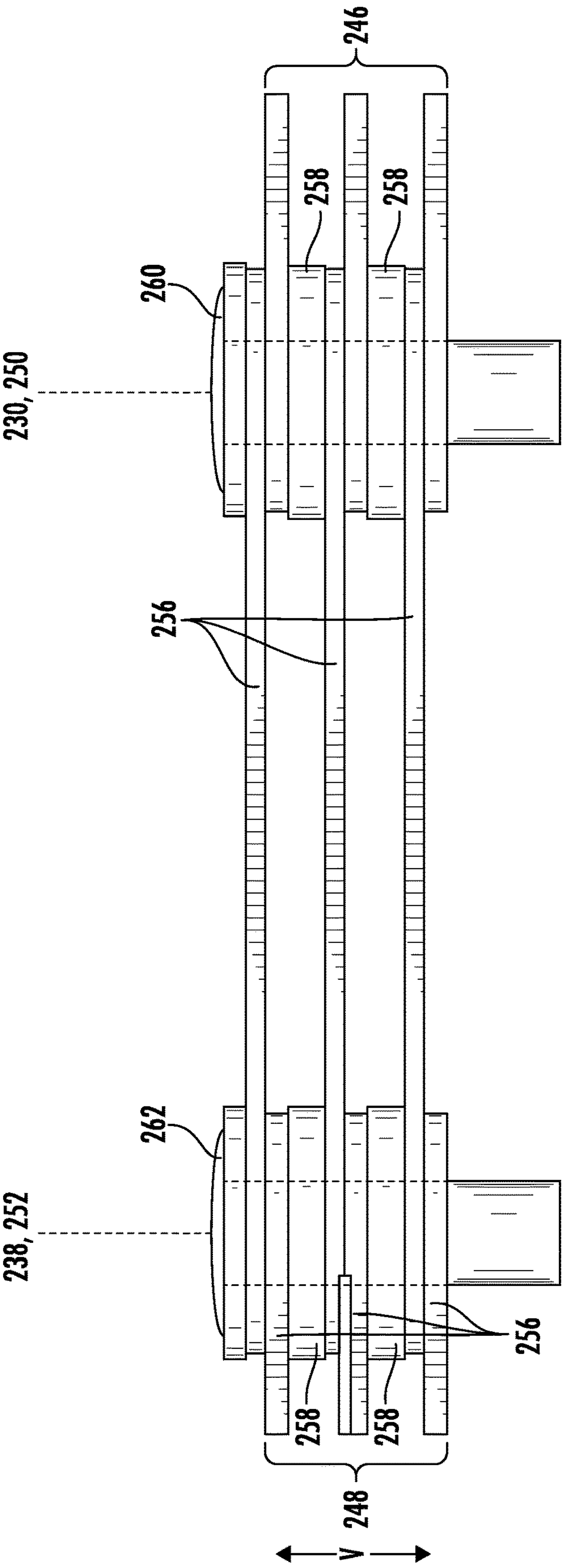
FIG. 7 provides an elevation view of a portion of the exemplary connector assembly of FIG. 4.

FIG. 1 is a perspective view of an appliance 100, such as a refrigerator appliance, according to exemplary embodiments of the present disclosure. FIGS. 2 and 3 provide elevation views of refrigerator appliance 100. As may be seen in FIGS. 1 through 3, appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Cabinet 102 generally defines one or more chambers (e.g., chilled chamber 120) for receipt of items for storage (e.g., food or beverages). Cabinet 102 may be insulated and refrigerator appliance 100 may further include a sealed system (not shown) that is operable to cool chilled chamber 120 and items stored therein.

Referring still to FIGS. 1 through 3, a door 122 is movably mounted or coupled to cabinet 102 with one or more connector assemblies 200 (e.g., located at a top or a bottom of door 122). A user may rotate door 122 open to access and interior of cabinet 102 (e.g., chilled chamber 120), and the user may rotate door 122 closed to seal the interior of cabinet 102. Thus, door 122 is generally movable between a closed position (e.g., FIGS. 1 and 2) and a fully open position (e.g., FIG. 3). As will be described in greater detail below, connector assembly 200 is generally joined to both cabinet 102 and door 122 at a suitable location between the top end 104 and the bottom end 106 of cabinet 102 on the left or right of chilled chamber 120 (e.g., depending on the preferred direction of door 122 rotation). In the illustrated embodiments, connector assembly 200 is generally provided at or proximal to bottom end 106 on the right of chilled chamber 120. Nonetheless, alternative embodiments may provide one or more additional or alternative connector assemblies at another suitable location between the top end 104 and the bottom end 106.

Generally, door 122 includes a door frame 202 that supports one or more cosmetic or insulating panels. As would be understood, such cosmetic or insulating panels may by mounted to the door frame 202 and physically or visually block access to the corresponding chilled chamber 120 in the closed position. In the illustrated embodiments, one or more of the panels includes a glass (e.g., glass, glass ceramic, or transparent polymer) pane for viewing the contents of chilled chamber 120 (e.g., in the closed position) and also assist with insulating chilled chamber 120. A seal or gasket 210 extends between door 122 and cabinet 102 (e.g., when the corresponding door 122 is in the closed position). The gasket 210 may assist with maintaining chilled air within the chilled chamber 120 and preventing heat from leaking into the same when the door 122 is in the closed position. In some embodiments, door 122 includes a handle 124 that a user may pull when opening and closing door 122.

As further illustrated in FIGS. 2 and 3, one or more electric components 212 may be attached to or supported on door frame 202 (e.g., directly or indirectly to move therewith relative to cabinet 102). In the illustrated embodiments, the electric elements include one or more light sources (e.g., light bulbs, light-emitting diodes, etc.) for illuminating chilled chamber 120 (e.g., when door 122 is in the closed position), as is generally understood. Nonetheless, further embodiments may include additional or alternative electric embodiments, such as an electronic display, input buttons, resistive heating elements (e.g., for mitigating or preventing condensation), or any other suitable electric element attached to door 122 to rotate therewith. As will be described in greater detail below, the electric heating element(s) on door 122 may be electrically connected to cabinet 102, such as to draw power from a power source or inverter or to otherwise communicate one or more electric signals (e.g., data signals) between separate features mounted to cabinet 102, such as a controller or processing device 214 (e.g., microprocessors, microcontrollers, application-specific integrated circuits (ASICS), CPUs or the like, such as general or special purpose microprocessors operable to execute programming instructions or micro-control code associated with operation of appliance 100).

Although refrigerator appliance 100 is illustrated as a single compartment refrigerator (e.g., wine chiller), it should be appreciated that aspects of the present disclosure may be applied to other types of refrigerator appliances, such as bottom mount, top mount, and side-by-side refrigerator appliances. Moreover, aspects of the present disclosure may be used for any other suitable domestic appliance that includes a rotating door 122 and electric component 212 thereon. For example, aspects of the present disclosure may be used in or with French door oven appliances, washing machine appliances, dryer appliances etc. to mount a door 122 to a cabinet 102 or housing.

Turning now to FIGS. 4 through 7, a connector assembly 200 will be described herein in more detail according to exemplary embodiments of the present disclosure. Generally, connector assembly 200 includes a separate hinge assembly 216 and conductor assembly 220. Hinge assembly 216 mechanically connects door 122 to cabinet 102 and facilitates movement of door 122. Specifically, hinge assembly 216 may rotatably secure the door 122 to the cabinet 102 to define movement (i.e., the path of motion) of the door 122 between the open position and the closed position. For instance, hinge assembly 216 may extend between two discrete hinge anchors, one of which (e.g., a first hinge anchor 222) is joined to cabinet 102 (e.g., FIG. 1) while the other is joined to the door 122 (e.g., FIG. 1). Such joints between the anchors 222, 224 and cabinet 102 or door 122 may include or be provided as a suitable adhesive or mechanical connector (e.g., bolt, screw, complementary clip assembly, etc.), as would be understood.

Between the first and second hinge anchors 222, 224, one or more hinge linkages 226, 228 may be provided to facilitate multi-point movement (e.g., multi-axis pivoting or roto-translating movement). Optionally, linear hinges may be provided with or as part of the hinge linkages 226, 228 to allow door 122 to translate away from cabinet 102 or adjacent cabinetry in addition to rotating open and closed. By translating in addition to rotating, interference between the door 122 and the adjacent cabinetry or the cabinet 102 itself can be avoided.

In the illustrated embodiments, a first hinge linkage 226 is rotatably joined to the first hinge anchor 222 at one end and defines a first link axis 230 (e.g., first hinge axis) about which the first hinge linkage 226 rotates relative to first hinge anchor 222. First link axis 230 may be parallel to the vertical direction V. At an opposite end of the first hinge linkage 226, first hinge linkage 226 may be rotatably joined to a second hinge linkage 228 and define a second link axis 232 (e.g., parallel to the first link axis 230 or vertical direction V) about which the first hinge linkage 226 rotates relative to second hinge linkage 228. As shown, second hinge linkage 228 may also be rotatably joined to the second hinge anchor 224 (e.g., at an end of second hinge linkage 228 that is opposite from second link axis 232) and define a third link axis 234 (e.g., parallel to the first link axis 230, second link axis 232, or the vertical direction V) about which the second hinge linkage 228 rotates linkage relative to second hinge anchor 224.

A follower linkage 236 may further be provided to constrain the multi-point rotation of first and second linkages 226, 228. For instance, one end of follower linkage 236 may be rotatably joined to first hinge linkage 226 (e.g., at an intermediate point thereof between the first and second link axes 230, 232 along a horizontal length of first hinge linkage 226) and define a first follower axis 238 (e.g., parallel to the first link axis 230, second link axis 232, third link axis 234, or the vertical direction V) about which follower linkage 236 rotates relative to first hinge linkage 226. The opposite end of follower linkage 236 may be rotatably joined to the second hinge anchor 224 (e.g., and horizontally spaced apart from third link axis 234 or second hinge linkage 228) and define a second follower axis 240 (e.g., second hinge axis) about which the follower linkage 236 rotates relative to second hinge anchor 224. The second follower axis 240 may be parallel to the first link axis 230, second link axis 232, third link axis 234, first follower axis 238, or the vertical direction V.

It is noted that the above-described hinge assembly 216 is merely exemplary, and any other suitable multi-point hinge or rotation assembly may be provided to facilitate a compound movement of door 122 relative to cabinet 102.

In contrast to hinge assembly 216, conductor assembly 220 electrically connects door 122 to cabinet 102. As shown, conductor assembly 220 is generally spaced apart from hinge assembly 216 such that the assemblies 220, 216 do not contact each other. For instance, conductor assembly 220 may be vertically spaced apart from hinge assembly 216. In other words, conductor assembly 220 may be disposed above or below hinge assembly 216. When assembled, conductor assembly 220 may be movable relative to hinge assembly 216 while electrically connecting cabinet 102 to door 122. The connection may be indeterminate of the movement of the door 122 between the open position and the closed position. Thus, although the hinge assembly 216 may define movement of the door 122 between the open and closed positions, the motion path defined by conductor assembly 220 may be distinct from and non-identical to the motion path defined by hinge assembly 216.

As shown, conductor assembly 220 includes a cabinet-side (CS) contact 242 and a separate door 122-side (DS) contact. When assembled, CS contact 242 is joined to cabinet 102 (e.g., at a corresponding mated contact) while DS contact 244 is joined to the door 122 (e.g., at a corresponding mated contact). Generally, each contact 242, 244 provides a separable conductive connection joint to permit electrical communication between the contact 242, 244 and its corresponding mated contact on cabinet 102 or door 122, respectively. The contacts 242, 244 may be multi-pin contacts (e.g., having an identical number of contacts). For instance, in the illustrated embodiments, CS contact 242 and DS contact 244 are each illustrated as 3-pin male plugs. In turn, the mated contacts will each include 3-pin female plugs. Nonetheless, it is understood that the CS and DS contacts 242, 244 may include or be provided as any suitable electrical connector, such as an 8P8C connector, D-subminiature connector, DC connector, USB-A connector, USB-B connector, USB-C connector, etc.

Between the CS contact 242 and the DS contact 244, one or more plate arms 246, 248 may be provided. Generally, the plate arms 246, 248 electrically connect (and permit electrical communication between) the CS contact 242 and the DS contact 244. The plate arms 246, 248 may be rigid (e.g., formed from a rigid conductive metal) and pivotable relative to the CS contact 242 and the DS contact 244. For instance, a first plate arm 246 may be pivotable about a first conductor axis 250 relative to the CS contact 242 and about a second conductor axis 252 relative to the DS contact 244. In some embodiments, the first and second conductor axes 250, 252 are parallel to each other (e.g., parallel to the vertical direction). In addition to the first plate arm 246, a second plate arm 248 may be provided to further connect the first plate arm 246 and pivot relative to the same. For instance, second plate arm 248 may be pivotable about a second conductor axis 252 relative to the first plate arm 246 and about a third conductor axis 254 relative to the DS contact 244.

Notably, the plate arms 246, 248 described herein may be especially durable and stationary (e.g., unlikely to become pinched or displaced or otherwise suffer damage during use of appliance 100).

In the illustrated embodiments, the first plate arm 246 is rotatably joined to the CS contact 242 at one end and defines the first link axis 230 (e.g., parallel to the vertical direction V) about which the first plate arm 246 rotates relative to CS contact 242—and thus relative to cabinet 102. At an opposite end of the first plate arm 246, first hinge linkage 226 may be rotatably joined to the second plate arm 248 and define the second conductor axis 252 (e.g., parallel to the first conductor axis 250 or vertical direction V) about which the first plate arm 246 rotates relative to second plate arm 248. As shown, second plate arm 248 may also be rotatably joined to the DS contact 244 (e.g., at an end of second plate arm 248 that is opposite from second conductor axis 252) and define the third conductor axis 254 (e.g., parallel to the first conductor axis 250, second conductor axis 252, or the vertical direction V) about which the second plate arm 248 rotates relative to DS contact 244—and thus relative to cabinet 102.

In certain embodiments, one or more axes are shared or vertically aligned (e.g., as coaxial) between the hinge assembly 216 and the conductor assembly 220. Thus, even as the assemblies move between the closed and open positions of the door 122, the horizontal distance between each aligned axis may remain constant (e.g., such that aligned axes are coaxial with each other). In particular, the first conductor axis 250 may be vertically aligned with one of the hinge axes. As an example, the first link axis 230 may be vertically aligned with first conductor axis 250. Optionally, the second conductor axis 252 may be vertically aligned with one of the hinge axes. As an example, the first follower axis 238 may be vertically aligned with the second conductor axis 252. Additionally or alternatively, the third conductor axis 254 may be vertically aligned with one of the hinge axes. As an example, the second follower axis 240 may be vertically aligned with the third conductor axis 254. In some such embodiments, each conductor axis 250, 252, 254 is shared or vertically aligned with a discrete hinge axis (e.g., 230, 238, 240). Nonetheless, one or more of the hinge axes may be an independent axis unaligned with any conductor axes 250, 252, 254. In the illustrated embodiments, the second and third link axes 232, 234 are each an independent hinge axis. Thus, the relative horizontal distance between the second link axis 232 and the conductor axes 250, 252, 254 may vary based on the location of the door 122 between the open and closed positions. Similarly, the relative horizontal distance between the third link axis 234 and the conductor axes 250, 252, 254 may vary based on the location of the door 122 between the open and closed positions.

Notably, the movement (i.e., motion path) of the conductor assembly 220 may be decoupled to the movement (i.e., motion path) of the hinge assembly 216. In particular, the hinge assembly 216 may define the motion path for the door 122, and although the conductor assembly 220 may move also move with the door 122, the conductor assembly 220 may define a separate motion path that does not constrain the motion of the door 122 between the open and closed positions.

In some embodiments, one or more of the plate arms 246, 248 includes multiple discrete conduction plates 256. As an example, the first plate arm 246 may include a plurality of spaced-apart (e.g., vertically spaced) conduction plates 256. Optionally, each of the conduction plates 256 of the first plate arm 246 may be parallel to each other (e.g., perpendicular to the vertical direction V, first conductor axis 250, or second conductor axis 252). As an additional or alternative example, the second plate arm 248 may include a plurality of spaced-apart (e.g., vertically spaced) conduction plates 256. Optionally, each of the conduction plates 256 of the second plate arm 248 may be parallel to each other (e.g., perpendicular to the vertical direction V, first conductor axis 250, or second conductor axis 252). Additionally or alternatively, each conduction plate 256 of the second plate arm 248 may be parallel to one or more conduction plates 256 of the first plate arm 246.

In certain embodiments, one or more insulator spacers 258 (e.g., spacer ring or spacer formed from an electrically insulative polymer) are be disposed between adjacent conduction plates 256. Specifically, at least one insulator spacer 258 may be disposed between each adjacent (e.g., sequentially or vertically adjacent) conduction plates 256. In turn, adjacent conduction plates 256 may be held apart and out of direct contact with each other. Moreover, adjacent conduction plates 256 may be electrically isolated from each other. As shown, sets of insulator spacers 258 may be disposed between adjacent spacer plates along one or more of the conductor axes 250, 252, 254. For instance, a first set of insulator spacers 258 may be disposed along (e.g., axially spaced apart on and coaxial with) the first conductor axis 250, a second set of insulator spacers 258 may be disposed along (e.g., axially spaced apart on and coaxial with) the second conductor axis 252, or a third set of insulator spacers 258 may be disposed along (e.g., axially spaced apart on and coaxial with) the third conductor axis 254.

In some embodiments, one or more mechanical fasteners (e.g., fastener bolts) helps join the plate arms 246, 248 or conduction plates 256. a fastener bolt may extend through multiple adjacent conduction plates 256 or insulator spacers 258. As an example, a first fastener bolt 260 may extend through the vertically spaced conduction plates 256 or insulator spacers 258 of the first plate arm 246 along the first conductor axis 250 (e.g., such that a shaft of the first fastener bolt 260 is coaxial with the first conductor axis 250). As an additional or alternative example, a second fastener bolt 262 may extend through the vertically spaced conduction plates 256 or insulator spacers 258 of the first plate arm 246 and the second plate arm 248 along the second conductor axis 252 (e.g., such that a shaft of the second fastener bolt 262 is coaxial with the second conductor axis 252). As another additional or alternative example, a third fastener bolt 264 may extend through the vertically spaced conduction plates 256 or insulator spacers 258 of the second plate arm 248 along the third conductor axis 254 (e.g., such that a shaft of the first fastener bolt 260 is coaxial with the third conductor axis 254).

When assembled, conductor assembly 220 may advantageously define a plurality of independent conductive paths 266. In particular, the conductive paths 266 may be defined through the plate arms 246, 248 in electrical isolation from or electrical parallel to each other from the CS contact 242 to the DS contact 244. For instance, at CS contact 242 and DS contact arm 244, a conductive bridge plate, bus, or wire may extend from each corresponding pin to a discrete conductive plate arm 246, 248. In some embodiments, the number of conduction paths or conductive plates (e.g., within a particular set or plate arm 246, 248) corresponds to the number of contact pins at CS contact 242 or DS contact 244. At each plate arm 246, 248, each discrete conduction plate 256 of a particular set may notably correspond to a different conductive path 266 of the plurality of independent conductive paths 266. Although spaced apart from each other, the conductive plates 246, 248 of the set of the first plate arm 246 and the set of second plate arm 248 may be disposed on or in electrical contact with each other (e.g., at second conductor axis 252). Thus, each of the conductive paths 266 may notably extend in series from the first plate arm 246 to the second plate arm 248.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A domestic appliance comprising:
- a cabinet defining an internal chamber;
- a door movable relative to the cabinet between an open position and a closed position;
- a hinge assembly rotatably securing the door to the cabinet, the hinge assembly defining a first hinge axis and a second hinge axis; and
- a conductor assembly electrically connecting the door to the cabinet, the conductor assembly comprising
  - a cabinet-side (CS) contact joined to the cabinet,
  - a door-side (DS) contact joined to the door,
  - a first plate arm extending between the CS contact and the DS contact in electrical communication therewith, the first plate arm being pivotable about a first conductor axis relative to the CS contact and a second conductor axis relative to the DS contact, the first conductor axis being vertically aligned with the first hinge axis, and
  - a second plate arm extending between the first plate arm and the DS contact in electrical communication therewith, the second plate arm being pivotable about the second conductor axis relative to the first plate arm, the second plate arm being further pivotable about a third conductor axis relative to the DS contact, the third conductor axis being vertically aligned with the second hinge axis.

2. The domestic appliance of claim 1, wherein the hinge assembly is vertically spaced apart from the conductor assembly.

3. The domestic appliance of claim 1, wherein the hinge assembly defines an independent hinge axis unaligned with the conductor axis of the conductor assembly.

4. The domestic appliance of claim 1, wherein the first plate arm comprises a plurality of vertically spaced conduction plates.

5. The domestic appliance of claim 4, wherein the conductor assembly defines a plurality of independent conductive paths from the CS contact to the DS contact and through the plurality of vertically spaced conduction plates, and wherein each conduction plate of the vertically spaced conduction plates corresponds to a different conductive path of the plurality of independent conductive paths.

6. The domestic appliance of claim 4, wherein the conductor assembly further comprises one or more insulator spacers disposed between vertically adjacent conduction plates of the plurality of vertically spaced conduction plates and electrically isolating the vertically adjacent conduction plates.

7. The domestic appliance of claim 6, wherein the conductor assembly further comprises a first fastener bolt extending through the plurality of vertically spaced conduction plates and the one or more insulator spacers along the first conductor axis.

8. A domestic appliance comprising:
- a cabinet defining an internal chamber;
- a door movable relative to the cabinet between an open position and a closed position;
- a hinge assembly rotatably securing the door to the cabinet; and
- a conductor assembly electrically connecting the door to the cabinet, the conductor assembly comprising
  - a cabinet-side (CS) contact joined to the cabinet,
  - a door-side (DS) contact joined to the door, and
  - a first plate arm comprises a plurality of vertically spaced conduction plates extending between the CS contact and the DS contact in electrical communication therewith, the first plate arm being pivotable about a first conductor axis relative to the CS contact and a second conductor axis relative to the DS contact,
  - wherein the conductor assembly defines a plurality of independent conductive paths from the CS contact to the DS contact and through the plurality of vertically spaced conduction plates, and
  - wherein each conduction plate of the plurality of vertically spaced conduction plates corresponds to a different conductive path of the plurality of independent conductive paths.

9. The domestic appliance of claim 8, wherein the conductor assembly further comprises
- a second plate arm extending between the first plate arm and the DS contact in electrical communication therewith, the second plate arm being pivotable about the second conductor axis relative to the first plate arm, the second plate arm being further pivotable about a third conductor axis relative to the DS contact.

10. The domestic appliance of claim 9, wherein the hinge assembly is vertically spaced apart from the conductor assembly.

11. The domestic appliance of claim 10, wherein the hinge assembly defines a first hinge axis vertically aligned with the first conductor axis and a second hinge axis vertically aligned with the third conductor axis.

12. The domestic appliance of claim 11, wherein the hinge assembly defines an independent hinge axis unaligned with the conductor axis of the conductor assembly.

13. The domestic appliance of claim 8, wherein the conductor assembly further comprises one or more insulator spacers disposed between vertically adjacent conduction plates of the plurality of vertically spaced conduction plates and electrically isolating the vertically adjacent conduction plates.

14. The domestic appliance of claim 13, wherein the conductor assembly further comprises a first fastener bolt extending through the plurality of vertically spaced conduction plates along the first conductor axis.

15. A refrigerator appliance comprising:

a cabinet defining an internal chamber;

a door movable relative to the cabinet between an open position and a closed position;

a hinge assembly rotatably securing the door to the cabinet to define movement of the door between the open position and the closed position; and a conductor assembly vertically spaced apart from the hinge assembly, the conductor assembly electrically connecting the door to the cabinet indeterminate of the movement of the door between the open position and the closed position, the conductor assembly comprising a cabinet-side (CS) contact joined to the cabinet, a door-side (DS) contact joined to the door, and a first plate arm extending between the CS contact and the DS contact in electrical communication therewith, the first plate arm being pivotable about a first conductor axis relative to the CS contact and a second conductor axis relative to the DS contact, wherein the first plate arm comprises a plurality of vertically spaced conduction plates, wherein the conductor assembly defines a plurality of independent conductive paths from the CS contact to the DS contact and through the plurality of vertically spaced conduction plates, wherein each conduction plate of the vertically spaced conduction plates corresponds to a different conductive path of the plurality of independent conductive paths, wherein the conductor assembly further comprises one or more insulator spacers disposed between vertically adjacent conduction plates of the plurality of vertically spaced conduction plates and electrically isolating the vertically adjacent conduction plates.

16. The refrigerator appliance of claim 15, wherein the conductor assembly further comprises a second plate arm extending between the first plate arm and the DS contact in electrical communication therewith, the second plate arm being pivotable about the second conductor axis relative to the first plate arm, the second plate arm being further pivotable about a third conductor axis relative to the DS contact.

17. The refrigerator appliance of claim 16, wherein the hinge assembly defines a first hinge axis vertically aligned with the first conductor axis and a second hinge axis vertically aligned with the third conductor axis.

18. The refrigerator appliance of claim 17, wherein the hinge assembly defines an independent hinge axis unaligned with the conductor axis of the conductor assembly.

19. The refrigerator appliance of claim 15, wherein the conductor assembly further comprises a first fastener bolt extending through the plurality of vertically spaced conduction plates along the first conductor axis.

* * * * *